(12) United States Patent
Singh et al.

(10) Patent No.: US 7,305,132 B2
(45) Date of Patent: Dec. 4, 2007

(54) CLASSIFICATION IN LIKELIHOOD SPACES

(75) Inventors: Rita Singh, Watertown, MA (US); Bhiksha Ramakrishnan, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 803 days.

(21) Appl. No.: 10/717,361

(22) Filed: Nov. 19, 2003

(65) Prior Publication Data

US 2005/0105795 A1    May 19, 2005

(51) Int. Cl.
G06K 9/62 (2006.01)
(52) U.S. Cl. .................. 382/224; 382/228
(58) Field of Classification Search ............ None
See application file for complete search history.

(56) References Cited

U.S. PATENT DOCUMENTS

| | | | |
|---|---|---|---|
| 4,246,570 A * | 1/1981 | Kochert et al. ............ 382/224 |
| 4,773,099 A | 9/1988 | Bosker .................... 382/14 |
| 5,060,277 A | 10/1991 | Bosker .................... 382/14 |
| 5,181,259 A | 1/1993 | Rorvig .................... 382/26 |
| 5,337,371 A | 8/1994 | Sato et al. ................ 382/14 |
| 5,505,057 A | 4/1996 | Sato et al. ................ 62/231 |
| 5,754,681 A * | 5/1998 | Watanabe et al. .......... 382/159 |
| 5,870,729 A | 2/1999 | Yoda ...................... 706/26 |
| 6,058,205 A | 5/2000 | Bahl et al. ................ 382/159 |
| 6,532,305 B1 * | 3/2003 | Hammen .................. 382/227 |
| 2001/0044719 A1 * | 11/2001 | Casey .................... 704/245 |

* cited by examiner

Primary Examiner—Matthew C. Bella
Assistant Examiner—Alex Liew
(74) Attorney, Agent, or Firm—Dirk Brinkman; Clifton D. Mueller; Gene V. VinoKur

(57) ABSTRACT

A method classifies data into multiple classes so that the data in each class have a class-conditional probability distribution. The class-conditional probability distributions of measured data are projected into a likelihood space. The projected class-conditional probability distributions in the likelihood space are then classified according to a discriminant classifier in likelihood space.

14 Claims, 9 Drawing Sheets

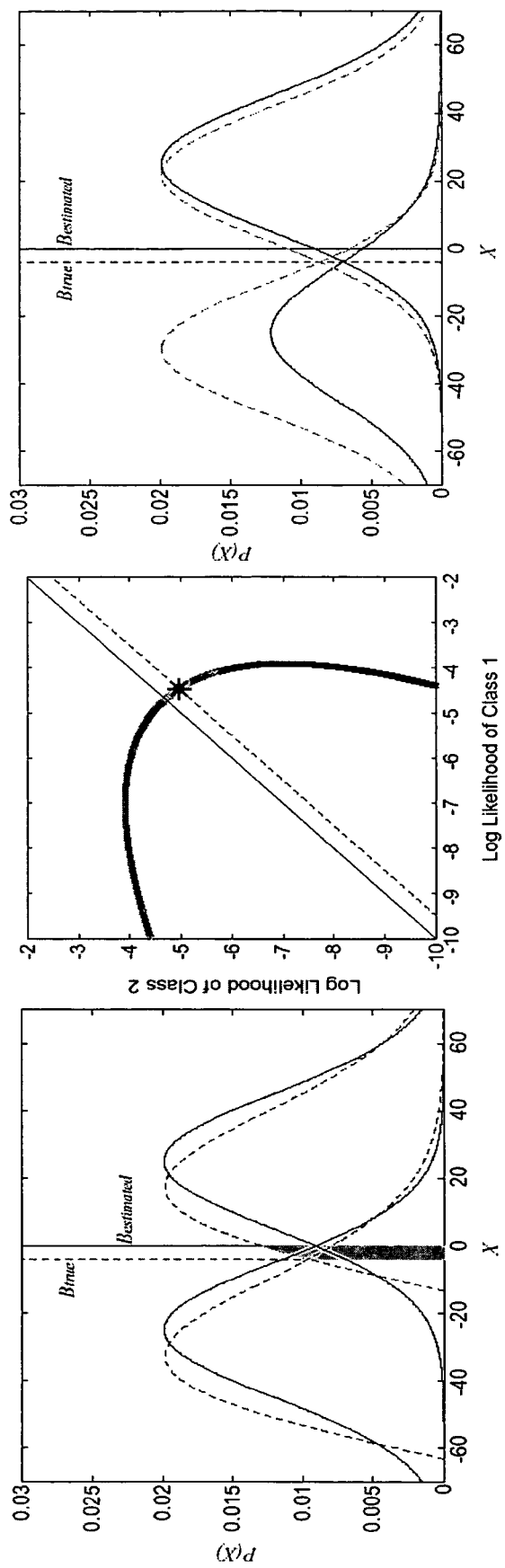

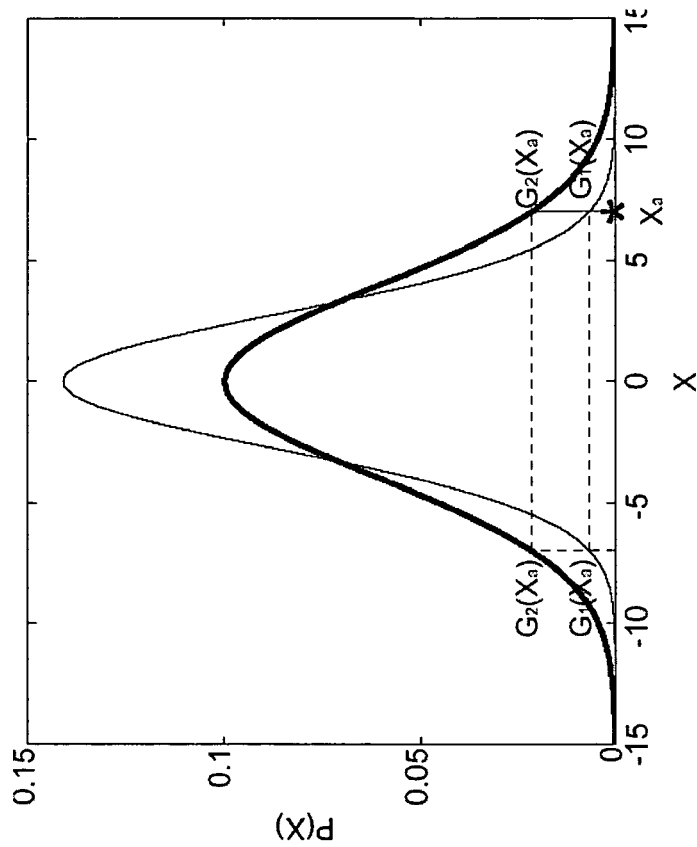
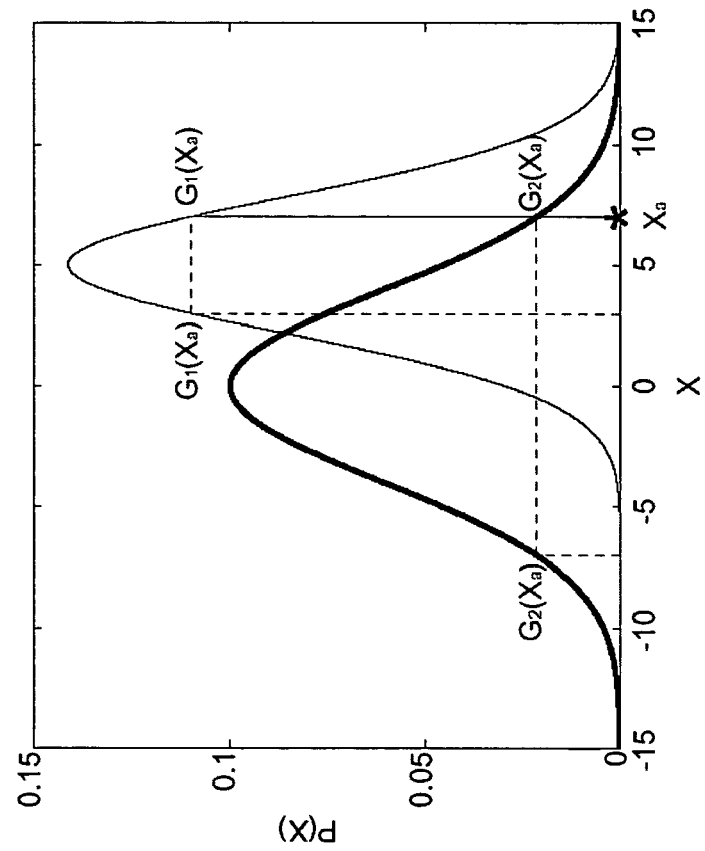
Fig. 4B
Fig. 4A

CLASSIFICATION IN LIKELIHOOD SPACES

FIELD OF THE INVENTION

The present invention relates generally to pattern classification, and more particularly to distribution-based classifiers.

BACKGROUND OF THE INVENTION

Pattern classification is used in many practical applications, such as visual pattern and speech recognition. In pattern classification, pertinent features or attributes of a measured signal are identified, and information about these features is extracted. Features can include shape, color, texture, motion, depth for visual signals, and pitch and amplitude for audio signals. These features are then associated or correlated with feature vectors. A large number of pattern classification systems are known. A small set of examples are described in U.S. Pat. No. 6,058,205, "System and method for partitioning the feature space of a classifier in a pattern classification system," issued to Bahl, et al. on May 2, 2000; U.S. Pat. No. 5,870,729, "Self-organizing neural network for pattern classification," issued to Toda on Feb. 9, 1999; U.S. Pat. No. 5,664,068, "Method and apparatus for pattern classification using distributed adaptive fuzzy windows," issued to Huang, et al., on Sep. 2, 1997; U.S. Pat. No. 5,505,057, "Pattern classification system," issued to Sato, et al., on Apr. 9, 1996; U.S. Pat. No. 5,337,371 "Pattern classification system," issued to Sato, et al., on Aug. 9, 1994; U.S. Pat. No. 5,181,259, "General method of pattern classification using the two domain theory," issued to Rorvig on Jan. 19, 1993; U.S. Pat. No. 5,060,277, "Pattern classification means using feature vector regions preconstructed from reference data," issued to Bokser on Oct. 22, 1991; U.S. Pat. No. 4,773,099, "Pattern classification means for use in a pattern recognition system," issued to Bokser on Sep. 20, 1998.

In pattern classification, it is generally required to obtain class probabilities for a particular feature vector to determine information, such as the number of occurrences of a particular feature in a signal and the time and place of each occurrence of the feature. For many applications, this is often done by modeling the marginal density of the feature space of a classifier and characterizing each class with a model. The class probabilities of the particular feature vector are then determined using a model for each class.

Pattern classification methods can be broadly categorized into two categories: The first category requires explicit class-conditional probability values of the signal being classified, and the second category does not. The first category is sometimes referred to as the sampling approach, while the second category is referred to as the diagnostic paradigm.

The second category of methods, i.e., methods that do not require explicit determination of class conditional probability values, typically determine discriminant functions of the signal being classified, and classify the signal on the values taken by these functions. The functions used may be diverse, ranging from simple linear functions, to complex structures such as classification and regression trees. These can be referred to as discriminant-based methods.

Methods in the first category require explicit representations of the probability distributions of classes. These distributions are usually estimated either using non-parametric kernel methods, e.g., Parzen windows, or parametric methods that assume specific parametric forms for the distributions, e.g., Gaussian mixtures. Class-conditional probabilities are used to estimate a posteriori class probabilities, which form the basis for classification. These methods can be referred to as distribution-based methods.

The dichotomy between the two categories of methods is not complete. Methods that use explicit representations of class probability distributions are effectively based on discriminant functions. For instance, the classification rule of a distribution-based two-class classifier is based on the comparison of the ratio of the a posteriori probabilities of the classes against a threshold. In that case, the ratio is the discriminant function. Multi-class classification can be expressed similarly as the successive application of a series of such two-class discriminants.

In order to impart conceptual clarity to the subject matter of the present invention, the distinct categorization of pattern classification methods is maintained.

Distribution-based classifiers are widely used for classification tasks in diverse disciplines, and are particularly useful in classifying real-valued data. However, the performance of these classifiers is dependent on obtaining good estimates of the class-conditional distributions of the various classes. While it is relatively easy to determine the best set of parameters for a given parametric model of distributions, determining the most appropriate parametric form is frequently a difficult problem. Inaccurate models can lead to reduced classification accuracies.

Therefore, it is desired to improve the performance of distribution-based classifiers under this scenario.

SUMMARY OF THE INVENTION

In pattern classification methods, which explicitly model class-conditional probability distributions, the true distributions are often not known. These are estimated from the data available to approximate the true distributions.

Therefore, the invention projects the original data into a space of likelihoods, and classification is performed in that likelihood space using discriminant functions or second-level distribution-based classifiers to reduce errors in classification.

Specifically, a method classifies data into multiple classes so that the data in each class have a class-conditional probability distribution.

The class-conditional probability distributions of measured data are projected into a likelihood space.

The projected class-conditional probability distributions in the likelihood space are then classified according to a discriminant classifier in likelihood space.

BRIEF DESCRIPTION OF THE DRAWINGS

FIGS. 3A-C compare density distributions data space;

FIGS. 4A&B are graphs of invertible and uninvertable likelihood projections;

DETAILED DESCRIPTION OF THE PREFERRED EMBODIMENT

Figure 1:
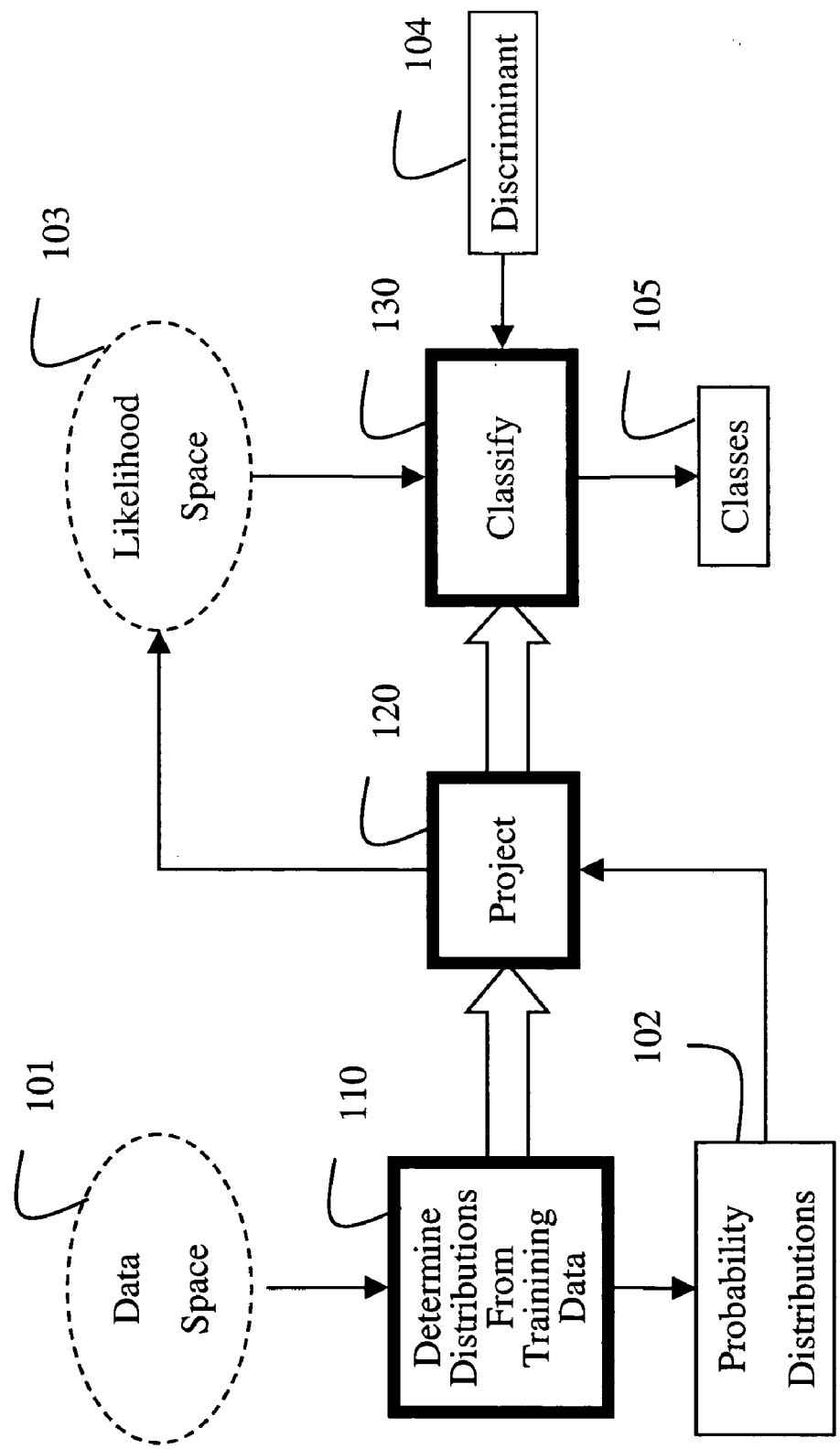
FIG. 1 is a flow diagram of a classifying method according to the invention.

As shown in FIG. 1, our invention distinguishes two computational spaces. The space in which actual observations, measured signals, or original data reside is called the data space 101. There, the computed 110 corresponding class-conditional probability distributions 102 are treated as facilitators for estimating a posteriori class probabilities to be used for Bayesian minimum error or minimum risk classification.

We treat the class-conditional probability distributions as facilitators for non-linear projections 120, which we call likelihood projections, into a likelihood space 103. The coordinates of the likelihood space are the class-conditional likelihoods of the original data for the various classes. In this space, the Bayesian classifier between any pair of classes in the data space can be viewed, for example, as a linear discriminant of unit slope with respect to the axes representing the two classes. The key advantage to be derived from working in the likelihood space according to the invention is that we are no longer restricted to considering only linear discriminants.

Classification 130 can now be based on any suitable classifier 104 that operates on the projected distributions to determine the classes 105. If the projecting distributions are the true distributions of the classes, then the optimal classifier in the likelihood space is guaranteed to result in error rates that are identical to that obtained by classifying the data in the original space.

When the projecting distributions are not the true distributions, the optimal classification accuracy in the likelihood space is still guaranteed to be no worse than that obtainable with the projecting distributions in the data space.

As an advantage of the invention, the classification accuracy in the likelihood space can be higher than that in the data space in this situation. This feature of likelihood projections permits us to use non-linear projections to compensate, to some extent, for errors in the modeling of class distributions in the original data space.

Secondary projections of data for improved classification has been described for kernel-based classification methods. e.g., support vector machines. Several density functions have also been used as kernels in those methods. However, most of those methods are specific to binary classification. While they can be restructured to perform multi-class classification, their performance is often not as good as that obtainable with other, unprojected multi-class classifiers.

Researchers in the field of speech recognition have observed large improvements in recognition accuracy when the classification of speech is performed in the space of a posteriori class probabilities. These have largely been unexplained so far. At the outset we would like to point out that the concept of likelihood spaces is equally applicable to both discrete valued and continuous valued data. For this reason, we use the term "probability distribution," or simply "distribution" to represent both continuous and discrete data. Where the treatment is specific to continuous data, we use the term "probability density" or "density."

Likelihood Based Projections

Our invention classifies data representing, for example, an audio or video signal, into N classes, where $P_X(X|C_1)$, $P_X(X|C_2)$, ... $P_X(X|C_N)$ represent the true distributions of the data from each of the classes. In this notation, the subscripted X represents a random vector, and the X within the parentheses represents a specific instance of the random vector, and P represents the probability that the random vector X takes the value X, given that it belongs to class $C_i$.

Estimates of true distributions that have been obtained for a distribution-based classifier are $\tilde{P}_X(X|C_1)$, $\tilde{P}_X(X|C_2)$, ... $\tilde{P}_X(X|C_N)$. Such estimates can be obtained, for example, by assuming a parametric form for the distributions and estimating the parameters of the distribution from training data using a likelihood maximization (LM) process.

In our invention, we define the likelihood projection of a vector X as an operation $L_N(X)$, resulting in an N-dimensional likelihood vector $Y_X$. A component of the likelihood vector $Y_X$ is $$Y_X = L_N(X) = [\log(\tilde{P}_X(X|C_1)) \log(\tilde{P}_X(X|C_2)) \ldots \log(\tilde{P}_N(X|C_N))] \quad (1)$$

We refer to the distributions $\tilde{P}_X(X|C_1)$, $\tilde{P}_X(X|C_2)$, ... $\tilde{P}_X(X|C_N)$ as the projecting distributions, and to the N-dimensional space whose coordinates are the likelihood space. When the dimensionality of the data vector X is greater than N, then the likelihood projection operation is a dimensionality reducing operation, otherwise it is a dimensionality-increasing transformation.

Properties of Likelihood Projections

Likelihood vector representations have the following properties that relate to classification in likelihood spaces.

Property 1: In the likelihood space, decision regions in the data space are compacted into contiguous regions.

The projecting distributions represent a set of decision boundaries in the space of that partition the data space into decision regions, one for each class. Here, by the term "decision region" of a class, we refer to the regions of the space that would be demarcated as belonging to that class by an optimal Bayesian classifier. Thus, the decision region for class is the region defined by $$X \in D_i \text{ if } P(C_i)\tilde{P}_X(X|C_i) > P(C_j)\tilde{P}_X(X|C_j) \forall j \neq i \quad (2)$$

where $P(C_i)$ represents the a priori probability of class $C_i$.

The boundary regions, where $$P(C_i)\tilde{P}_X(X|C_i) = P(C_j)\tilde{P}_X(X|C_j)$$

for some j, are not attributed to any class by Equation (2), and are attributed to one of the competing classes based on some preset rule. The decision regions defined by Equation (2) may in turn include several disjoint regions or be multiply connected. In the likelihood space, these possibly disjoint or multiply connected regions are projected into the region Ei, which is defined by $$Y_X \in E_i \text{ if } Y_X^{(i)} + Z_i > Y_X^{(j)} + Z_j \forall j \neq i \quad (3)$$

where $Z_i = \log(P(C_i))$. It is trivial to show that the region is convex, and therefore simply connected. From Equation (3), we can deduce that if both $Y_X$ lie within $E_i$ then, for any $0 \leq \alpha \leq 1$ $$\alpha Y_{X_1}^{(i)} + (1-\alpha)Y_{X_2}^{(i)} + Z_i > \alpha Y_{X_1}^{(j)} + (1-\alpha)Y_{X_2}^{(j)} + Z_j \forall j \neq i \quad (4)$$

also lies in $E_i$, thereby proving that $E_i$ is convex, and therefore simply connected. Thus, the likelihood projection transforms even disjoint or multiply connected decision regions in the data space to convex, simply connected ones in the likelihood space.

Figures 2A, 2B:
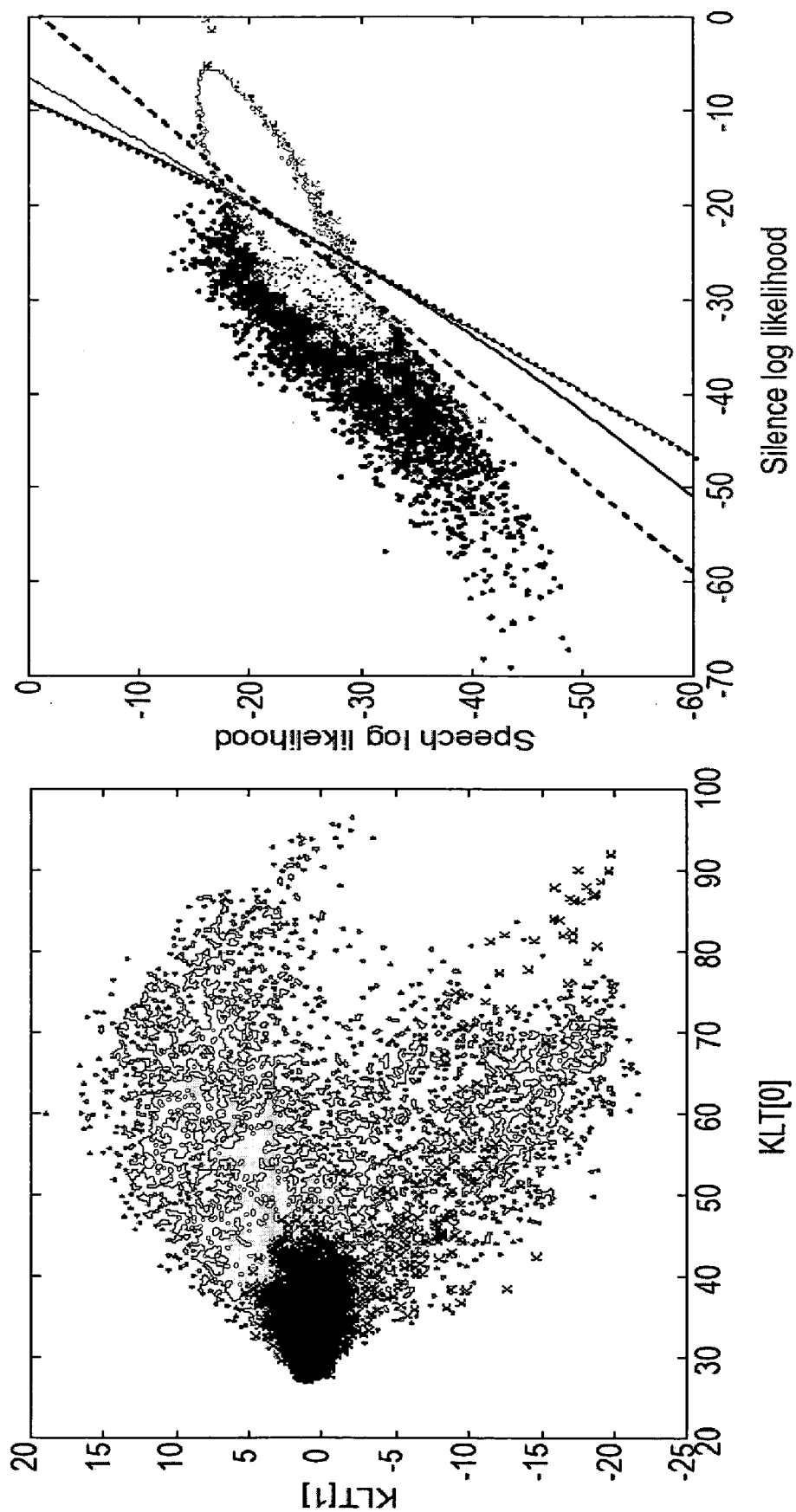
FIG. 2A is a scatter graph of a speech and non-speech signal in data space.
FIG. 2B is a scatter graph of a speech and non-speech signal in a likelihood space according to the invention.

FIGS. 2A-2B show this property through an example wherein data vectors from two classes in a recording of a parametrized speech signal have been projected into a likelihood space using projecting distractions, which were estimated from representative training data.

FIG. 2A shows the scatter in the data space and FIG. 2B shows the scatter in the likelihood space. The two axes represent the first and second components of the vectors, which were derived using a Karhunen Loeve Transform (KLT) based projection of the log spectra of 25 ms frames of the speech signal. In FIG. 2A, the crosses represent data vectors from non-speech regions. The dots represent data from speech regions. The projecting distributions for both classes were mixtures of 32 Gaussian distributions, determined from speech and non-speech training data. The dotted line represents the optimal classifier in the data space. The solid and dashed lines represent the optimal linear and quadratic discriminants in the likelihood space.

The classes are those corresponding to speech and non-speech regions of the recorded signal. The Figures show the scatter of these classes in the original data space and the likelihood space. We observe that the likelihood projection compacts the two classes.

Property 2: The optimal classifier in the likelihood space is guaranteed to perform no worse than the optimal Bayesian classifier based on the projecting distributions.

This follows as a consequence of Property 1. In the data space, the optimal minimum-error Bayesian classifier is given by $$X \in C_i : i = \mathrm{argmax}_j \{P_X(X|C_j)P(C_j)\} \quad (5)$$

A classifier, which uses the set of estimated distributions, approximates this as $$X \in C_i : i = \mathrm{argmax}_j \{\tilde{P}_X(X|C_j)P(C_j)\} \quad (6)$$

which can be equivalently stated in terms of log likelihoods as $$X \in C_i : i = \mathrm{argmax}_j \{\log(\tilde{P}_X(X|C_j)) + \log(P(C_j))\} \quad (7)$$

Equation (7) can be restated as a sequence of pair-wise comparisons between classes. Classification between any two classes is performed as $$X \in \begin{cases} C_i & \text{if } \log(\tilde{P}_X(X|C_i)) - \log(\tilde{P}_X(X|C_j)) > T_{ij} \\ C_j & \text{otherwise} \end{cases} \quad (8)$$

where is $T_{ij} = \log(P(C_j)) - \log(P(C_i))$.

Classification between N classes requires N-1 pair-wise classifications of the kind defined by Equation (8). The pair-wise comparisons represented by Equation (8) can be easily translated into the likelihood space. To do this, we define a vector $A_{ij}$ as $[0 0 1 0 \ldots -1 0 \ldots]$, where the 1 occurs in the $i^{th}$ position, and the −1 is in the $j^{th}$ position. Equation (8) can now be redefined in the likelihood space as $$X \in \begin{cases} C_i & \text{if } A_{ij}^T Y_X > T_{ij} \\ C_j & \text{otherwise} \end{cases} \quad (9)$$

Equation (9) is a linear discriminant, where the slope of the discriminant is unity. In the likelihood space, as in the data space, classification between N classes requires N-1 classifications of the kind defined by Equation (9). Thus, it is possible to define a classifier in the likelihood space that performs identically to a Bayesian classifier based on the projecting distributions in the space of X. It follows that the performance of the optimal classifier in the likelihood space cannot be worse than that obtainable with the projecting distributions in the original data space. It also follows that if the projecting distributions are the true distributions of the classes, then the optimal classification performance in the likelihood space is identical to the optimal classification performance in the original data space.

Classification in Likelihood Spaces

As a consequence of Property 2, the performance of the optimal classifier in the likelihood space is lower bounded by the classification accuracy obtainable with the optimal Bayesian classifier based on the projecting distributions in the data space. Therefore, it may actually be possible to estimate classifiers in the likelihood space that perform better than the optimal Bayesian classifier estimated from the projecting distributions.

In the original data space, the true distributions of the data can be extremely complicated. Therefore, the distributions modeling the various classes can also result in complicated, possibly even multiple, disjoint, estimated decision boundaries. Likelihood projections map the regions demarcated by these boundaries onto a single, contiguous region in the likelihood space. A Bayesian classifier between any two classes that is based on the projecting distributions maps onto a linear discriminant of slope 1.0 in the likelihood space. When projecting densities are continuous at the decision boundaries, data points adjacent to the decision boundaries, which can be potentially misclassified, also get mapped onto the region adjoining this linear discriminant regardless of the spatial complexity of the boundaries in the original space.

The geometrical simplicity of having misclassified regions adjoin the convex region representing any class in the likelihood space renders it possible to easily determine a different functional form for the discriminant, which reduces the average classification error, compared to the linear discriminant of slope 1.0. Any classifier that is effective on contiguous classes can be used, e.g., linear, quadratic or logistic regression discriminants. This is illustrated in FIG. 2B. The dotted line represents the optimal Bayesian classifier estimated in the original data space. The slope of the line is 1.0. The Y intercept of the line was estimated using held-out test data. The solid line represents the optimal linear discriminant in the likelihood space, also estimated using the same held-out data. This discriminant results in 4.5% lower classification error relative to the dotted line. The solid line represents a quadratic discriminant function, also estimated on the same held-out data.

The determination of a new linear discriminant can be interpreted as corresponding to the determination of linear or non-linear transformations of class distributions in the data space to achieve better approximation of optimal classification boundaries. For instance, a linear discriminant of slope 1.0 with a Y intercept other than that of the original linear discriminant, corresponds to scaling of class distributions in the data space.

A linear discriminant of slope other than 1.0 in the likelihood space corresponds to exponentiation the class densities by some power in the data space. A transform of the densities result in a different set of decision boundaries than those obtained from the original class-conditional densities. The discriminants in the likelihood space can be construed to map onto these modified decision boundaries in the data space.

Figure 2C:
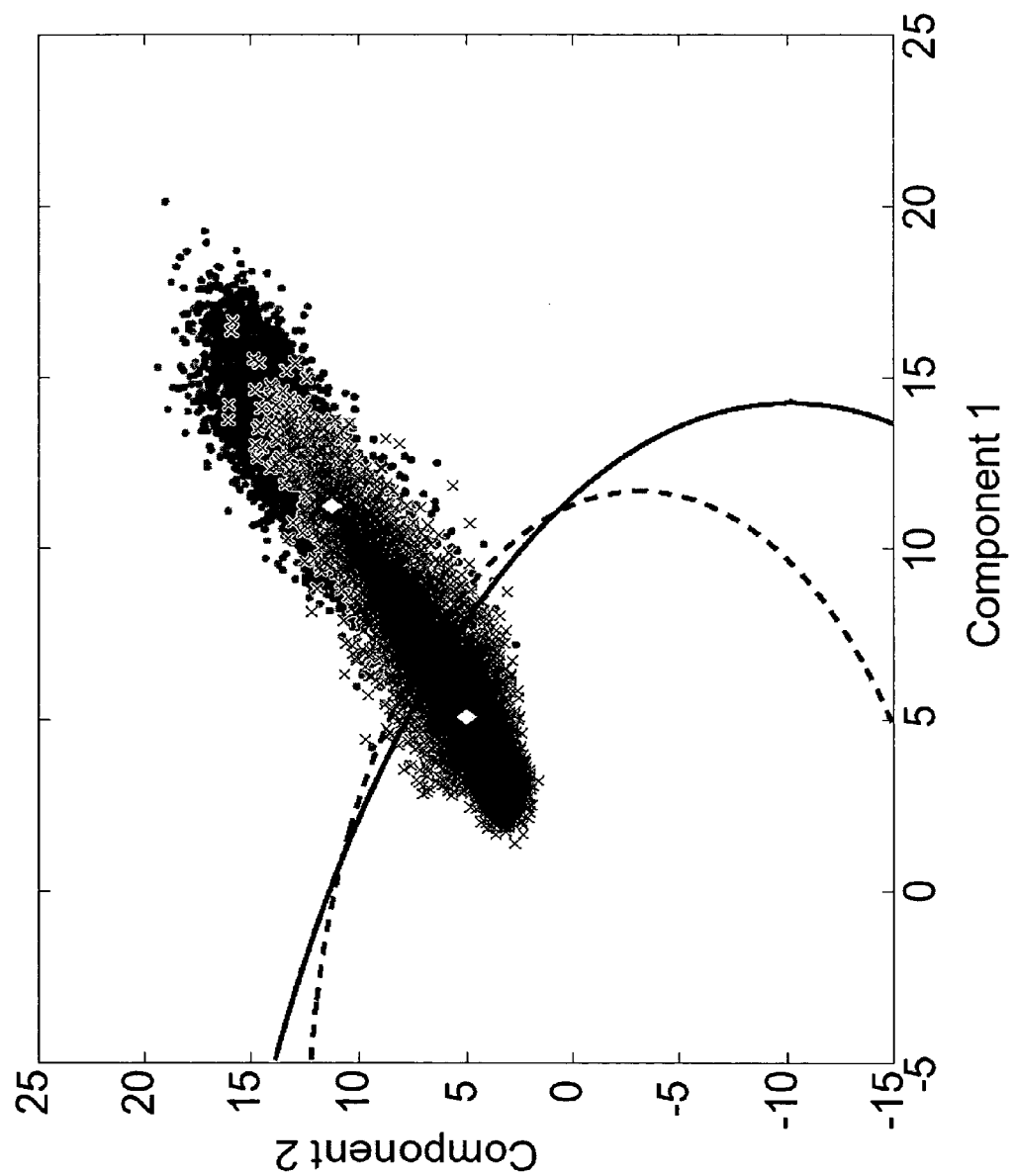
FIG. 2C is a graph of classification boundaries.

FIG. 2C shows this with an example. FIG. 2C shows classification boundaries obtained from original class distributions, and from the transformed class distributions represented by linear discriminants of non-unit slope in likelihood space. The dense and sparse regions represent the scatter of data from two classes. The white spots in the centers of these classes represent the location of their means. The dotted line represents the decision boundary obtained by modeling both classes as Gaussian distributions. The solid line represents the mapping of the optimal linear classifier in the likelihood space defined by the Gaussian class densities, back into the data space.

In this example 120-dimensional log spectral vectors, derived as described below, are projected into two dimensions. The probability density of each of the classes is modeled by a single Gaussian density. Therefore, the dotted line shows the classification boundary obtained from these Gaussian densities, and the solid line shows the decision boundary obtained by mapping the optimal linear discriminant separating the two classes in the corresponding likelihood space back into the data space.

The reverse mapping of the linear discriminant is simple in this case. If C's represent two classes, $\tilde{P}$ represent their estimated Gaussian densities, and Y represents the likelihood space vector derived by projecting a vector using these densities, then $$Y_X = (Y_X^{(1)}, Y_X^{(2)}) = (\log(\tilde{P}_X(X|C_1)), \log(\tilde{P}_X(X|C_2))). \quad (10)$$

The optimal linear discriminant in the likelihood space can be represented as $$AY_X^{(1)} + B = Y_X^{(2)}. \quad (11)$$

This can be represented in terms of the projecting densities as $$\tilde{P}_X(X|C_1)^A e^B = \tilde{P}_X(X|C_2). \quad (12)$$

The new decision boundary is thus the locus of all vectors that satisfy Equation (12).

More generally, however, such simple interpretations are not possible. For instance, a quadratic discriminant of the form $$(Y_X^{(1)})^2 + D(Y_X^{(2)})^2 + EY_X^{(1)}Y_X^{(2)} + F = 0 \quad (13)$$

maps onto the following discriminant in data space:

$$\tilde{P}_X(X|C_1)^{\log(\tilde{P}_X(X|C_1)) + E\log(\tilde{P}_X(X|C_2))} \tilde{P}_X(X|C_2)^{D\log(\tilde{P}_X(X|C_2))} e^F = 1. \quad (14)$$

Clearly, this cannot be obtained by any simple transformation of the individual class distributions, due to the presence of the cross term. Other, more complex discriminants in likelihood space are mapped onto even more complex functions of class distributions in the data space.

Training Classifiers in Likelihood Spaces

The reduced classification error in the likelihood space is a consequence of compensation for errors in modeling class distributions in the data space. In the context of classification, distribution modeling errors can result from two causes.

First, the analytical model selected to represent the distribution of a data set may be inappropriate for the data. Second, the parameters of the model for any class are usually estimated such that the resulting distribution best represents the distribution of the training data for that class, without reference to the distributions of other classes.

FIGS. 3A-C shows the problems that can result in errors using a synthetic example. In the example shown, data are one-dimensional. Two classes with Rayleigh distributions have been erroneously modeled as Gaussian distributions. The dotted lines in FIG. 3A show the true probability densities of the two classes. The solid lines show the estimated Gaussian densities. The first and second moments of the Gaussian distributions are identical to those of the true (Rayleigh) distribution of the data, i.e., they represent the maximum likelihood Gaussian estimates that would be obtained with unlimited training data from the two classes. The optimal decision boundary, $B_{true}$, is the value of the abscissa at the point where the true densities cross over. This is indicated by the vertical dotted line. The estimated decision boundary, $B_{estimated}$, occurs at the abscissa where the Gaussian estimates of the densities cross over and is indicated by the vertical solid line. The shaded portion of the solid line represents data that will be misclassified due to the difference between $B_{true}$ and $B_{estimated}$. This error is the direct result of erroneous modeling of Rayleigh distributions as Gaussian.

FIG. 3B shows the two-dimensional likelihood projection of data from the two classes. We note that the curve represents a one-dimensional manifold in the two-dimensional likelihood space. This is expected because the projection is a deterministic dimensionality-increasing transform. The estimated Bayesian classifier in the data space is represented by the solid line of slope 1.0. The star on the curve represents the optimal decision threshold, $B_{true}$, in the data space. The optimal classifier in the likelihood space can therefore be any line or curve that passes through the point marked by the star, e.g., the linear discriminant represented by the dotted diagonal line in FIG. 3B.

Classification with a linear determinant other than the solid line in FIG. 3B is equivalent to classification with a transformed version of the class distributions in the data space. For example, the optimal discriminant represented by the dotted line in FIG. 3B is equivalent to classification with the scaled Gaussian distributions shown in FIG. 3C. As a result of the scaling, the Gaussian distributions now cross over at the optimal classification boundary. The optimal classification boundary may also be obtained by modeling the classes with a different set of Gaussian distributions in the data space, in the first place.

Several methods for discriminative training of distributions for distribution-based classifiers are known. Those methods attempt to estimate class distributions to optimize the classification performance obtained with a Bayesian classifier. FIG. 3C shows an example of such discriminatively motivated Gaussian estimates for the Rayleigh class distributions of FIG. 3A. The estimates too cross over at the optimal classification boundary. However, the principle of classification in likelihood spaces remains valid.

Even when class distributions are discriminatively trained, the performance of the optimal classifier in the likelihood space derived from these distributions is only lower bounded by the performance of the optimal Bayesian classifier based on the class distributions themselves. Also, regardless of the manner in which class distributions are trained, the form of the classification boundaries in the data space are constrained by the model chosen for the distributions. For instance, if class distributions are modeled as Gaussian distributions, the resultant Bayesian classifier is a quadratic discriminant regardless of how the Gaussian distributions are trained. On the other hand, the data-space discriminants corresponding to a discriminant in likelihood space can be significantly more complex than those obtainable with the Bayesian classifier in data space. For example, when class distributions are Gaussian, even a simple quadratic discriminant in the likelihood space with no cross terms corresponds to a fourth-order polynomial discriminant in the data space. Therefore, it is plausible that a superior classifier can be obtained in the likelihood space even when class distributions are discriminatively trained.

Thus far, it must be clear from this description far that when classifiers in the likelihood space are simple linear or quadratic discriminants, improved classification in the likelihood space is largely a consequence of compensating for classification errors in regions adjoining the classification boundaries in the data space. Such discriminants cannot be expected to compensate for classification errors which occur for other reasons. Such errors, for example, can occur when the distributions modeling the classes in the original space miss entire regions of the optimal decision regions given by the true class distributions, altogether.

However, as an advantage of the invention, classifiers which are more complex than simple linear or quadratic discriminants, can be defined in the likelihood space. For instance, one may define distribution-based classifiers in the likelihood space. Such classifiers can result in better classification than linear or quadratic discriminants. In general however, as the decision boundaries in the data space approach the optimal boundaries, the gains to be expected from classifying in likelihood spaces quickly diminish. Also, in this situation, the decision boundaries in the data space, which the optimal discriminant in the likelihood space maps onto, approach the decision boundaries given by the class densities themselves.

We guarantee that the best classifier in the likelihood space performs at least as well as the best Bayesian classifier in the data space that is based on the projecting distributions. This is not a guarantee that it performs at least as well as the best classifier of any kind in the data space. In fact, unless the likelihood projection is invertible, there is no assurance whatsoever that the best possible classifier in the likelihood space can perform comparably with the best possible classifier in the data space.

Localization of Data Vectors by their Likelihood Projections

The likelihood projection is invertible when it is guaranteed that no more than a single data vector projects onto any likelihood vector. However, likelihood projections are generally not invertible, as shown in FIG. 4, and the likelihood projection of a data vector cannot be guaranteed to uniquely identify the data vector.

Two Gaussian distributions transform data point into a pair of density values, respectively. In FIG. 4A, the two Gaussian distributions have different means. The two vertical dotted lines show the other values of X that result in the density values. It is clear that there is only one point (star) that results in both distributions.

In FIG. 4B, the means of the two Gaussian distributions are identical. In this case, the mapping from values to density values cannot be inverted.

Nevertheless, we do note that as the number of class distributions in the likelihood projection increases, the likelihood projection of a vector increasingly localizes it in the data space. Consider a likelihood vector $Y_N$. Let $U^i_X$ represent the region in the data space such that $$\exp(Y_X^{(i)}) \leq \tilde{P}_X(X:X \in U_X^i | C_i) \leq \exp(Y_X^{(i)}) + \epsilon, \quad (15)$$

Where U is an infinitesimally small number. The likelihood vector localizes X to lie in the region $V^j_X$ defined by $$V^j_X = \bigcap_{i=1}^{j} U^i_X \quad (16)$$

It is easy to see that $$V^1_X \supseteq hu\ 2_X \supseteq \ldots \supseteq V^N_X \quad (17)$$

is a decreasing series. Knowledge of the likelihood vector is equivalent to knowing that X lies within V, i.e., Y contains the positional information that X lies in V. Note that is guaranteed not to be larger than the smallest U, while it can be much smaller. It must also be noted that V may be empty for many likelihood vectors and is guaranteed to be non-empty only if the likelihood vector has been generated from any data vector. Conversely, for any likelihood vector Y that has been generated through the projection of a data vector X, V cannot be empty and must contain at least one data point, namely X itself.

Figure 5C:
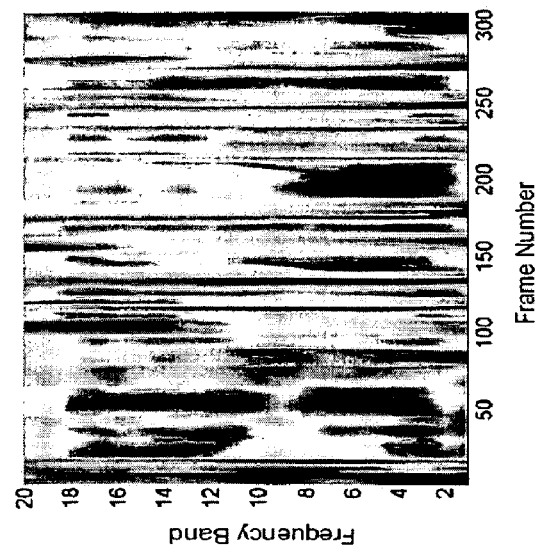
FIG. 5C is a reconstructed spectrograph from the vectors of FIG. 5B.
Figure 5B:
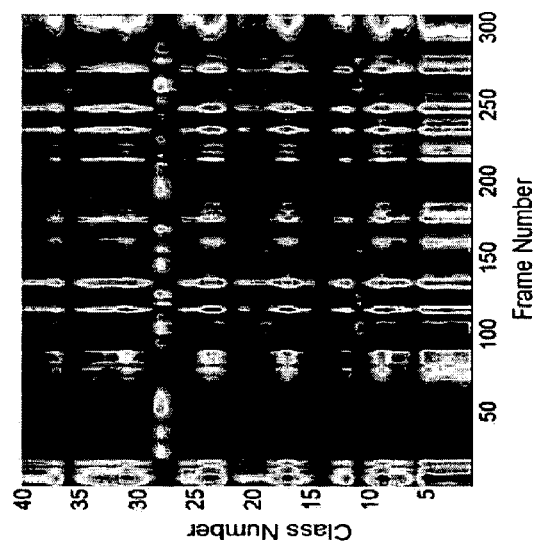
FIG. 5B is a plot of corresponding vectors in likelihood space according to the invention.
Figure 5A:
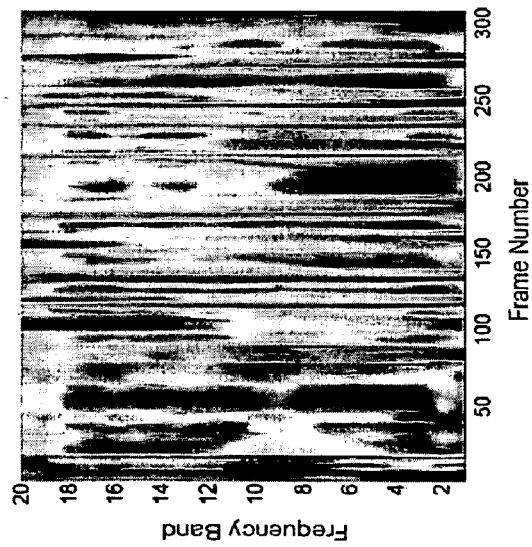
FIG. 5A is a spectrograph of an audio signal.

FIGS. 5A-C show the localization of data vectors by likelihood projections with an example. FIG. 5A shows a spectrographic representation of 20-dimensional log-spectral vectors derived from successive 25 ms long windows of a speech signal. The abscissa represents the frame index and the ordinate represents the index of the components of the vectors. The intensity is proportional to its numerical value. FIG. 5B shows the sequence of 40-dimensional vectors in likelihood space with class indices on the ordinate. FIG. 5C shows the log-spectral vectors reconstructed from the vectors of FIG. 5B. It can be seen that FIGS. 5A and 5C are substantially similar, validating our methodology.

So far, we have only described the existence of classifiers in the likelihood space that can classify no worse than any Bayesian classifier based on the projecting distributions. The mere existence of such classifiers, however, is no assurance that they can, in fact, be estimated, or that the actual classification performance obtained with the classifiers estimated in likelihood space will always be superior to that of the Bayesian classifier.

Estimation of classifiers is always difficult, and the final performance of the classifier is additionally governed by other factors such as the estimation procedure used, size of training data, etc. We can only hypothesize that the fact that the decision regions of the Bayesian classifier are mapped onto convex regions of the likelihood space, makes it simpler to estimate better classifiers in the likelihood space. The hypothesis must itself be experimentally substantiated.

Classification of Visual Textures

Although much research has been reported on the classification, retrieval and synthesis of images of visual texture, there is no precise definition of visual texture. Most researchers agree that images of visual texture are characterized by some degree of homogeneity, and typically contain repeated structures, often with some random variation. Thus, images of the surface of water, fabrics, cloudy skies, even wallpaper are all considered textures.

In 1966, a photographer published a set of 112 textures, including pictures of walls, matted surfaces, see Brodatz, *Textures: A Photographic Album for Artists and Designers*, Dover. The so called "Brodatz texture database" has been derived by extracting sub-images from 8-bit 512×512 pixel digitization of these images. Nine non-overlapping 128×128 pixel sub-images have been extracted from each of the textures. The set of 1008 resulting images has been the subject of several research papers over the years.

Figure 6:
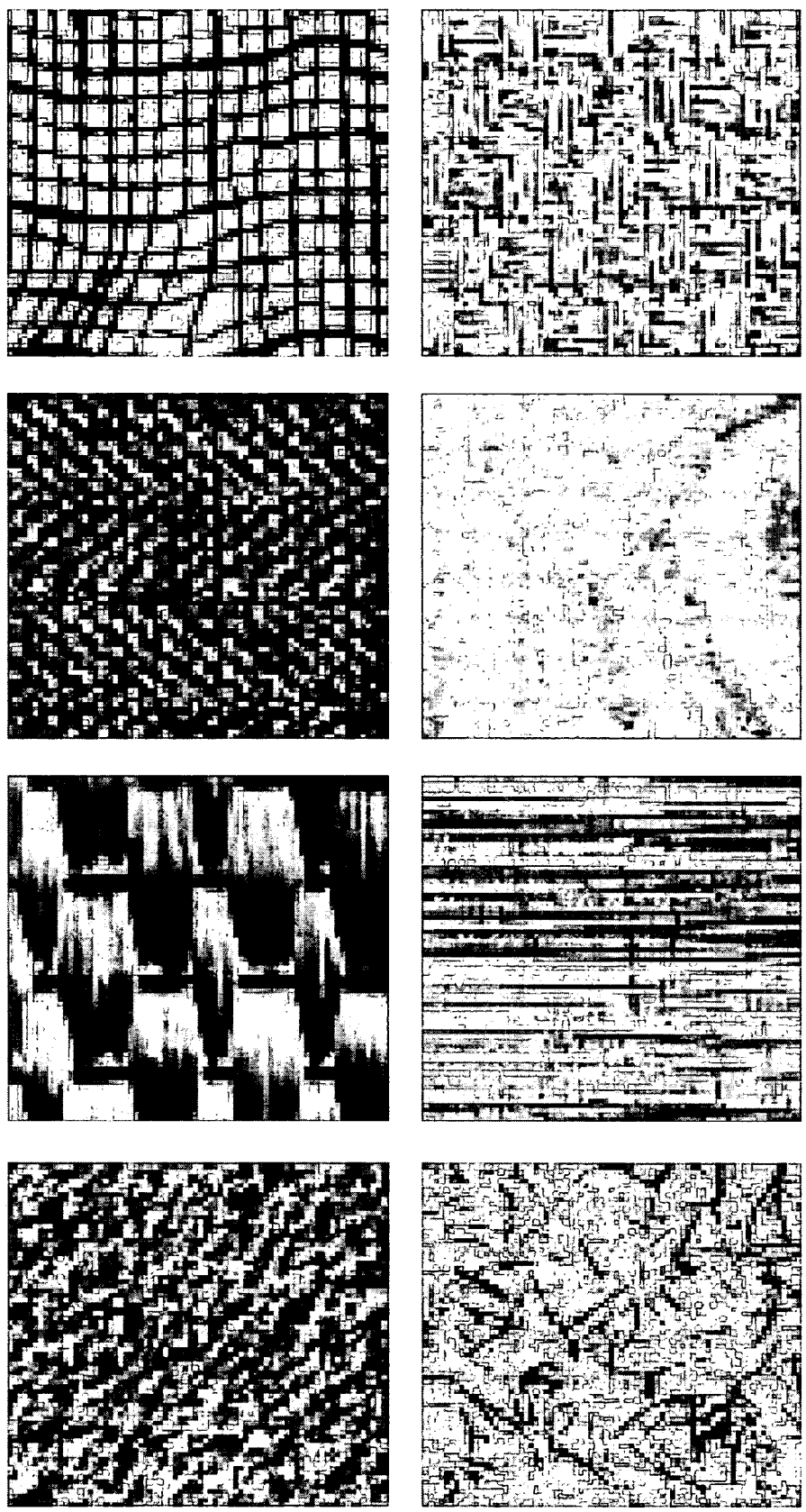
FIG. 6 shows Brodatz's textures.

FIG. 6 shows a few examples of Brodatz's textures. We evaluated classification in likelihood spaces according to the invention on the Brodatz texture database.

Figure 7:
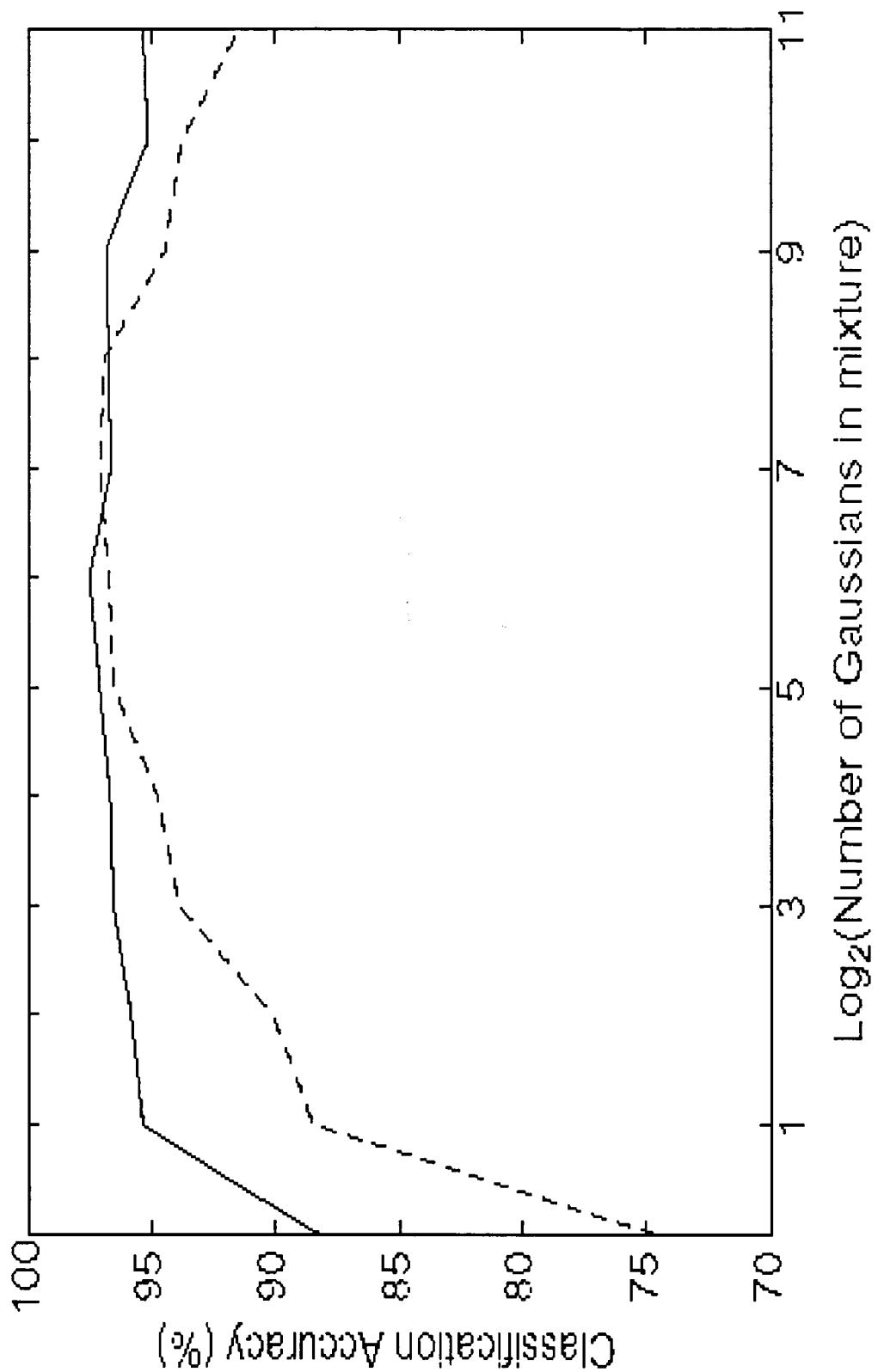
FIG. 7 is a graph comparing the method according to the invention for a visual signal.

FIG. 7 compares the classification accuracy of our method applied to a visual signal. The X-axis represents the log of the number of Gaussian distributions in the mixture Gaussian distributions used to model class distributions in the data space. The dotted line represents classification accuracy obtained by a prior art Bayesian classifier in the data space, and the solid line represents classification accuracy in the corresponding likelihood space according to the invention. Clearly, the best overall classification accuracy is obtained in the likelihood space. The differences between the methods at the extremes of the curves are significant to the 0.05 level or better.

Classification of Speech Sounds

We also applied our method to the TIMIT speech database, Zue, "Speech database development at MIT: TIMIT and beyond," Speech Communication, 9, 351-356, 1990. TIMIT is a standard database used by speech researchers for development of signal processing and classification algorithms.

Figure 8:
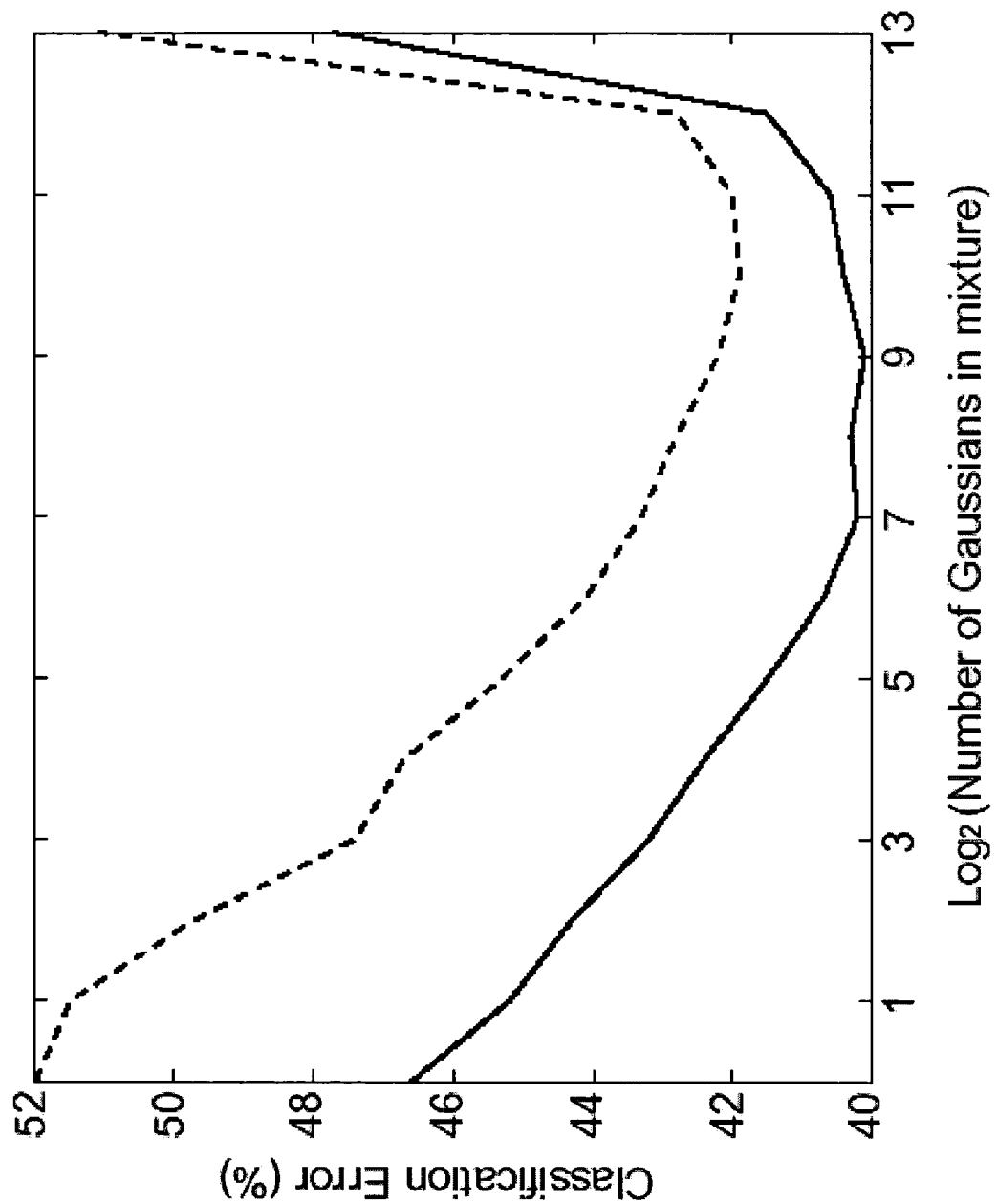
FIG. 8 is a graph comparing the method according to the invention for an audio-visual signal.

FIG. 8 compares the classification accuracy of our method applied to an audio signal. The X-axis represents the log of the number of Gaussian distributions in the mixture Gaussian distributions used to model class distributions in the data space. The dotted line represents the classification accuracy obtained by the Bayesian classifier in the data space, and the solid line represents classification accuracy in the corresponding likelihood space according to the invention. In all cases, the classification accuracy obtained in the likelihood space is significantly superior to that obtained in the original data space.

The decision boundaries of classifiers in likelihood spaces represent classification boundaries that are obtained as non-linear functions of class-conditional densities in the data space. Even in the simplest cases, these functions might include operations such as unequal scaling, rotation, skewing, etc. of class-conditional densities.

Searching for the optimal set of transformations of densities to compensate for basic modeling errors is difficult in the data space. However, when the problem of accounting for unknown modeling errors in original spaces is translated into the likelihood space as the problem of finding a suitable discriminant function, it is much more amenable to solution than the former.

Indeed, this can result in higher classification accuracies than that obtained in the data space. So far, we have limited ourselves to linear discriminant functions because our primary object is to demonstrate that better classification is possible in likelihood spaces, rather than to obtain the best classifier for the data considered. One advantage with linear discriminants is that the optimal classifier in the data space is also a linear discriminant in the likelihood space. Thus, any search for an optimal linear discriminant in the likelihood space can also consider this classifier. This is a simple way of ensuring that the classifier in the likelihood space does not perform worse than the one in the original data space.

However, better classification performance is possible through the use of other discriminant functions such as quadratic discriminants, or logistic regressors. Also, discriminant-based multi-class classification is possible with a combination of binary classifiers using a voting mechanism. Other possibilities include cyclic redundancy codes and pair-wise coupling. We also note that it is possible to train second-level distribution based classifiers in the likelihood space. Experimental evidence indicates that this can also result in large improvements in accuracy over classifying in the data space.

It is to be understood that various other adaptations and modifications may be made within the spirit and scope of the invention. Therefore, it is the object of the appended claims to cover all such variations and modifications as come within the true spirit and scope of the invention.

We claim:

1. A method for classifying measured data into N classes, the measured data in each of the N classes having a class-conditional probability distribution, comprising:

projecting the class-conditional probability distributions of the measured data into a likelihood space, in which the projected class-conditional probability distributions are estimated, and in which $P_X(X|C_1), P_X(X|C_2), \ldots, P_X(X|C_N)$ represent true distributions of the measured data from each of the N classes, the subscripted X of the probability P represents a random vector, the X within the parentheses represents a specific instance of the random vector X, and the probability P represents the probability that the random vector X takes the value X, given that the value X of the random vector X belongs to class $C_i$, where i is an integer from 1 to N, and estimates of the true distributions are $\tilde{P}_X(X|C_1), \tilde{P}_X(X|C_2), \ldots, \tilde{P}_X(X|C_N)$, and the likelihood projection of the random vector X is an operation $L_N(X)$, resulting in an N-dimensional likelihood vector $Y_X$, and the likelihood vector $Y_X$ is $Y_X = L_N(X) = [\log(\tilde{P}_X(X|C_1)) \log(\tilde{P}_X(X|C_2)) \ldots \log(\tilde{P}_X(X|C_N))]$; and classifying the projected class-conditional probability distributions in the likelihood space according to a discriminant classifier in the likelihood space.

2. The method of claim 1, in which the projecting is non-linear.

3. The method of claim 1, in which the measured data are discrete.

4. The method of claim 1, in which the measured data are continuous.

5. The method of claim 1, further comprising:

applying a likelihood maximization process to training data to obtain the estimated class-conditional probability distributions.

6. The method of claim 1, in which the measured data represent a speech signal.

7. The method of claim 1, in which the measured data represent a visual signal.

8. The method of claim 1, in which the discriminant classifier is a linear discriminant with a unit slope.

9. The method of claim 1, in which the discriminant classifier is a quadratic discriminant.

10. The method of claim 1, in which the discriminant classifier is a logistic regression.

11. The method of claim 1, in which the discriminant classifier is a distribution-based classifier.

12. The method of claim 1, in which the projecting operation is a Gaussian function.

13. The method of claim 1 in which the projecting operation is a mixture of Gaussian functions.

14. The method of claim 1, in which the projecting is invertible.

* * * * *